(12) United States Patent
Capuozzo et al.

(10) Patent No.: US 9,384,501 B2
(45) Date of Patent: Jul. 5, 2016

(54) MANAGING REPUTATIONS (71) Applicant: Accenture Global Services Limited, Dublin (IE)

(72) Inventors: Giuseppe Capuozzo, Rome (IT); Orlando Onorato, Rome (IT); Marco Borghini, Civitavecchia RM (IT)

(73) Assignee: Accenture Global Services Limited, Dublin (IE)

( * ) Notice: Subject to any disclaimer, the term of this patent is extended or adjusted under 35 U.S.C. 154(b) by 308 days.

(21) Appl. No.: 13/722,402

(22) Filed: Dec. 20, 2012

(65) Prior Publication Data

US 2013/0166374 A1 Jun. 27, 2013

(30) Foreign Application Priority Data

Dec. 22, 2011 (EP) .................................. 11425307

(51) Int. Cl.
*G06Q 30/02* (2012.01)
*G06Q 10/06* (2012.01)
*G06Q 30/06* (2012.01)
*G06Q 10/10* (2012.01)

(52) U.S. Cl.
CPC ........ *G06Q 30/0276* (2013.01); *G06Q 30/0282* (2013.01)

(58) Field of Classification Search
CPC .................................................. G06Q 30/0282
USPC ................................................... 705/1.1–912
See application file for complete search history.

(56) References Cited

U.S. PATENT DOCUMENTS

| 5,283,856 | A | 2/1994 | Gross et al. |
| 7,720,835 | B2* | 5/2010 | Ward et al. .................... 707/710 |
| 2006/0253582 | A1 | 11/2006 | Dixon et al. |
| 2008/0005223 | A1* | 1/2008 | Flake et al. ................... 709/203 |
| 2008/0208786 | A1 | 8/2008 | Serrano-Morales et al. |
| 2010/0114744 | A1* | 5/2010 | Gonen ........................... 705/35 |
| 2012/0179752 | A1* | 7/2012 | Mosley et al. ................ 709/204 |
| 2013/0007012 | A1* | 1/2013 | Selkowe Fertik et al. .... 707/748 |
| 2013/0018877 | A1* | 1/2013 | Gabriel et al. ................ 707/723 |
| 2013/0085804 | A1* | 4/2013 | Leff et al. .................... 705/7.29 |

FOREIGN PATENT DOCUMENTS

EP 2 040 215 3/2009

OTHER PUBLICATIONS

Office Action in Canadian Application No. 2,799,240, dated Nov. 24, 2014, 2 pages.
Extended European Search Report for Application No. 11425307.3 dated Sep. 27, 2012. 8 pages.
Malone, et al. "Semi-Structured Messages are Surprisingly Useful for Computer-Supported Coordination" *CSCW Proceedings of the Conference on Computer Supported Cooperative Work* (Jan. 1, 1986) pp. 102-114.

(Continued)

*Primary Examiner* — Jonathan Ouellette
(74) *Attorney, Agent, or Firm* — Fish & Richardson P.C.

(57) ABSTRACT

In general, a method includes enabling a user to specify a rule that causes a message to be formed, the rule being based on a reputation of a product and the reputation being based on information, from an online source, that is indicative of the reputation of the product.

18 Claims, 7 Drawing Sheets

(56) References Cited

OTHER PUBLICATIONS

Office Action in CA Application No. 2,799,240, dated Oct. 28, 2015, 2 pages.

Office Action in Europe Application No. 11425307.3, dated Mar. 21, 2016, 7 pages.

* cited by examiner

MANAGING REPUTATIONS

CROSS-REFERENCE TO RELATED APPLICATIONS

This application claims the benefit of priority to European Patent Application No. 11425307.3, filed on Dec. 22, 2011, of which the full contents are incorporated herein by reference.

BACKGROUND

This specification relates to managing reputations.

A product, for example, can develop a reputation. Knowing the reputation and trying to alter it can be important to a provider of the product.

SUMMARY

In general, in one aspect, a method includes enabling a user to specify a rule that causes a message to be formed, the rule being based on a reputation of a product and the reputation being based on information, from an online source, that is indicative of the reputation of the product.

In general, in another aspect, a method includes enabling a user to define when a message about a product is to be sent based on specified conditions associated with information that is gathered from an online source and that is indicative of a reputation of the product.

Aspects may include none, one, or more of the following features. The formed message is transmitted. The rule causes the message to be formed based on the reputation satisfying a condition. The condition includes a threshold to which a value associated with the reputation is compared. The value is associated with the information. The value includes a reputation score calculated based on the information. The information is weighted. The weighting is based on a keyword associated with the information. The weighting is based on the online source of the information. The message tends to offset the reputation or support the reputation. The message includes information that has been substituted for placeholder data. The placeholder data is associated with one or more of a user name, a product identity, or an information source. The information is grouped into predefined categories based on a theme of the information. The predefined categories are associated with respective reputations, the respective reputations being based on the information in the respective categories. The message includes one or more of a forum post, an email, an instant message, physical mail, and a social network message. The rule specifies one or more of a content of the message, a tone of the message, a time at which the message will be sent, and a frequency with which the message will be sent. An effectiveness of the message is determined. Determining the effectiveness includes gathering updated information from an online source. Future messages are formed based on the updated information.

The details of one or more embodiments of the subject matter described in this specification are set forth in the accompanying drawings and the description below. Other potential features, aspects, and advantages of the subject matter will become apparent from the description, the drawings, and the claims.

DESCRIPTION

Figure 1:
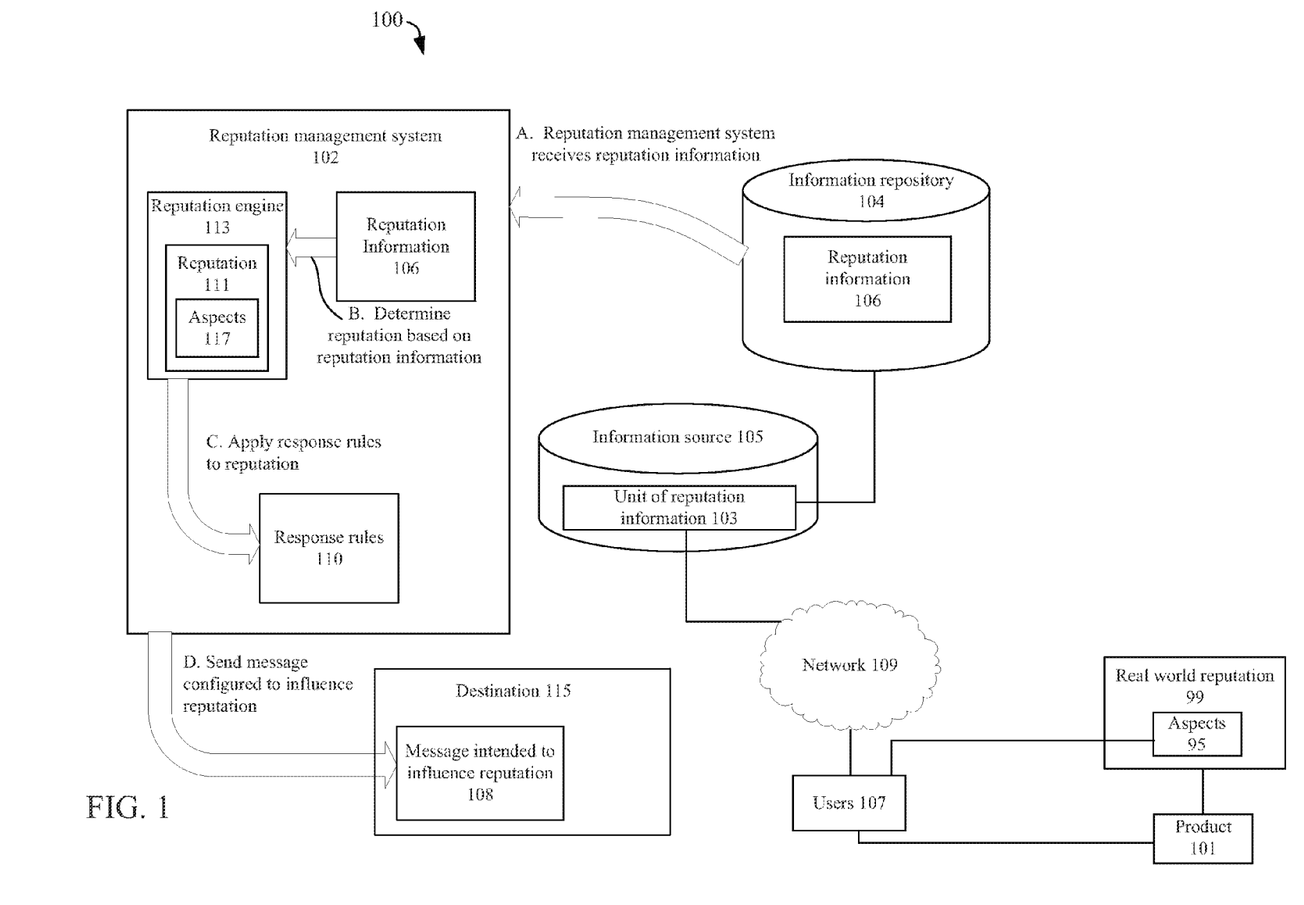
FIGS. 1, 2, 5, and 6 are block diagrams of systems.

FIG. 1 illustrates a system 100 for managing reputations, for example, reputations of goods or services or other products. In the example shown, the system 100 includes a reputation management system 102 that cooperates with an information repository 104.

In general, the reputation management system 102 uses information indicative of one or more aspects 95 of a real-world reputation 99 of a product 101 (sometimes referred to as units of reputation information 103) gathered, accumulated, aggregated, or otherwise received from one or more information sources 105 to infer and manage one or more of those aspects of the product's reputation in web sites, audio-visual media, stores, and a wide variety of other venues. In some examples, the product 101 may include goods or services provided by a business, a non-profit organization, an individual, or some other entity.

Although the example of FIG. 1 shows the information repository 104 and the reputation management system 102 as single distinct entities, the system 100 may include any number of information repositories or pieces of them, and the functions of the reputation management system 102 may be distributed across and replicated in any number of entities and places.

In some examples, the information source 105 is a resource (e.g., a web site) that is accessible to (and subject to interaction with) users 107 on a network 109 such as the Internet. In some examples, the information source 105 may be a web site that provides or accumulates or aggregates or assembles product reviews in the form of articles, user-constructed forums and bulletin boards, and other vehicles for public sentiment regarding a product that can be observed. The opinions, reviews, remarks, and complaints of the users 107 stored on the information source 105 can be regarded as respective units of reputation information 103 that are representative of aspects 95 of the real-world reputation 99 of the product 101.

Figure 2:
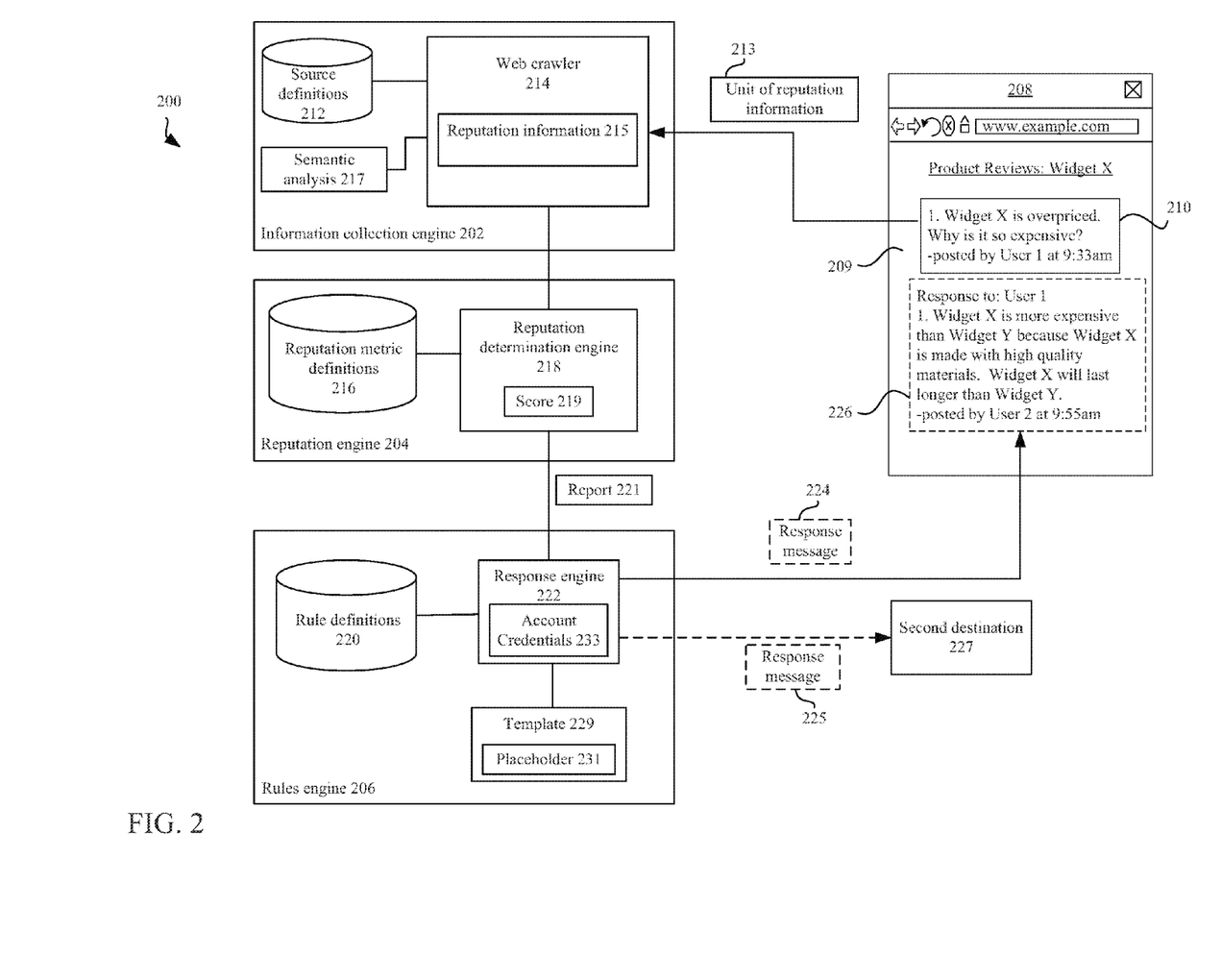

The information source 105 may also include one or more features that allow consumers or sponsors (e.g., a merchant associated with a product review presented on an information source) to interact with one another. For example, if the information source 105 includes a web site that presents user-provided product reviews, the web site may include features that allow for messages to be sent to a product reviewer in the form of a forum response message, a personal (private) message, an e-mail, and an instant message. An example of this interaction is shown in FIG. 2. We use the phrase reputation information broadly to include, for example, any information collected from a source (e.g., a web site, a news article, or an electronic message) that can be used to provide an inference or determination of the reputation of a product, such as the product 101. In some examples, we use the phrase units of reputation information broadly to include, for example, information collected from a source (e.g., a user or an electronic source) that can be used to provide an inference or determination of the reputation of a product, such as the product 101. In some examples, units of reputation information 103 can be aggregated, grouped, or otherwise processed to form reputation information 106.

In some examples, the reputation information 106 can be gathered and stored in the information repository 104 in an organized fashion (e.g., in one or more tables or other databases). The reputation information 106 can be gathered periodically (e.g., once per hour), on demand (e.g., in response to a command provided by a user), or according to a predetermined schedule (e.g. a non-periodic schedule). The reputation information 106 may also be gathered in substantially real time. For example, the information repository 104 can gather the reputation information in response to receiving an indication that new reputation information 106 has become available in the information source 105.

As shown in FIG. 1, the system 100 can be viewed as having functions A-D. The functions do not necessarily occur in the illustrated alphabetical order, and the system 100 may include more or fewer functions than the functions A-D. In general, for a given product, the reputation management system 102 obtains the reputation information 106 from the information repository 104 and infers aspects 117 of a putative reputation 111 of the product corresponding to aspects 95 of the real-world reputation 99 of the product 101. The reputation information 106 can be gathered from the information repository 104 periodically (e.g., once per hour), on demand (e.g., in response to a command provided by a user), or according to a predetermined schedule (e.g. a non-periodic schedule). The reputation information 106 may also be gathered in substantially real time. For example, the reputation management system 102 may gather reputation information 106 in response to receiving an indication that new reputation information 106 has become available in the information repository 104.

A reputation engine 113 of the reputation management system 102 applies one or more rules 110 to the inferred aspects of the putative reputation, and transmits one or more messages to a destination 115 (e.g., the information source 105, if the information source 105 provides an appropriate venue to receive the message 108, such as a discussion forum) that is designed to influence the real world reputation 99 of the product 101.

In function A, the information repository 104 provides reputation information 106 to the reputation management system 102. In some examples, the reputation information 106 includes information indicative of the reputation of the product 101, which may be based on numerous units of reputation information 103 gathered from multiple information sources 105. For example, the reputation information 106 may be based on or include a product review from a user that states "Widget X is unreliable."

In function B, the reputation management system 102 uses the reputation information 106 to determine a reputation 111 of the product associated with the reputation information 106. The reputation management system 102 can use a variety of tools and techniques to glean useful information from the reputation information 106. For example, the reputation management system 102 may determine aspects 95 of a product's reputation 99 by analyzing keywords in the reputation information 106. For example, if the reputation information 106 includes a product review from one of the users 107 that states "Widget X is unreliable," the reputation management system 102 may identify the product 101 as "Widget X" based on corresponding keywords, and may further identify a negative review based on the presence of the keyword "unreliable."

In some examples, the analysis of the reputation information 106 is referred to as sentiment analysis, which may include techniques such as keyword analysis, semantic analysis, and other analytical processes. In the example above, the reputation management system 102 may determine that the product has a negative reputation (e.g., relative to a threshold) based on the presence of the keyword "unreliable". If the reputation management system 102 collects additional reputation information that contains keywords with a negative connotation (e.g., "terrible," or "lousy"), the product's reputation 111 can be tarnished further. How positive or negative a product's reputation is can be represented by a metric, such as a numerical score on a scale of 1-100, and the product's reputation 111 can be adjusted based on each instance of reputation information collected by the reputation management system 102.

In function C, the reputation management system 102 applies one or more response rules 110 to the reputation 111. As shown in FIG. 1, the response rules 110 can be stored in the reputation management system 102, or may be otherwise accessible to the reputation management system 102. In some examples, the response rules 110 govern the type, frequency, content, and destination of one or more messages transmitted by the reputation management system 102 that are intended to influence the reputation 111 of a product.

As described in more detail below, the response rules 110 may define conditions which, if met, cause one or more messages (e.g., the message 108) to be sent to a destination 115 (e.g., to the information source 105 or to one or more other recipients or destinations) that are intended to favorably influence the real world reputation 99 of the product 101. For example, applying the response rules 110 could cause the reputation management system 102 to determine that the reputation 111 associated with the product 101 is negative enough to warrant sending the message 108 in an attempt to counteract or offset the negative sentiment represented by the reputation 111.

In function D, the reputation management system 102 sends a message 108 to the destination 115 that is intended to influence the real world reputation 99 of the product 101. For example, if the product 101 has a negative reputation 111 based on the reputation information 106 that included a complaint about the product's unreliability (such as the review described above), the response rules 110 may cause the reputation management system 102 to transmit the message 108 to one or more of the users 107 who complained about the product's unreliability, and the message 108 may include a statement such as "although defects in Widget X are rare, Widget X is covered by a three year warranty!" In this way, the reputation management system 102 transmits messages that attempt to counteract the negative sentiment caused in part by the negative product review regarding the product's unreliability. For example, the message 108 may be written in a tone that counters the tone of an existing message or expression of sentiment, or may contain facts that counter the facts in the existing message or expression of sentiment. The message 108 can also be configured to encourage one or more desirable qualities of an existing message.

FIG. 2 illustrates a system 200 that includes an information collection engine 202, a reputation engine 204, a rules engine 206, and an information source 208. In some examples, one or more of the information collection engine 202, the reputation engine 204, and the rules engine 206 may be part of a reputation management system, such as the reputation management system 102, or may operate as discrete components. In this example, the information source 208 is a product review web site 209 that includes reviews for a product: Widget X. The product review web site 209 includes a venue for users to create, publish, share, or otherwise present product reviews to a community of users. For example, the product review web site 209 includes a user review 210 that disparages an aspect of Widget X (i.e., the user review 210 is a complaint from "User 1" regarding the high price of Widget X).

In some examples, the information collection engine 202, the reputation engine 204, and the rules engine 206 can work together to counteract the negative sentiment regarding Widget X on the product review web site 209, as well as any other information sources. To do this, the information collection engine 202 uses a web crawler 214 to extract one or more units of reputation information 213 from one or more information sources (e.g., the information source 208) specified by the source definitions 212. In some examples, the web crawler extracts units of reputation information 213 by extracting text or other information from an information source and passing the extracted information to one or more additional components of the reputation management system. For example, the web crawler 214 may pass text or other information to a semantic analysis engine 217, which may in turn generate reputation information from the extracted text or other information. In some examples, the functionality of the semantic analysis engine 217 can be provided by one or more other components of the system 200, such as the reputation engine 204.

In this example, the information source 208 is one of the information sources specified by the source definitions 212, and the unit of reputation information 213 extracted by the web crawler 214 includes information associated with the user review 210, such as the text presented in the user review 210, the identity of the author of the user review 210 (i.e., "User 1"), and a time at which the user review 210 was posted (i.e., 9:33 am). In some examples, a user may specify the source definitions 212 by providing a list of web sites from which the web crawler 214 will extract reputation information, and pre-bundled packages of information sources (e.g., a predefined group of web sites) may be provided to a user for selection for inclusion in the source definitions 212. The source definitions 212 may also include a Uniform Resource Locator (URL) associated with an information source, one or more identifiers or credentials for accessing the information source (e.g., an account for accessing a social networking site), and parsing rules for handling information retrieved from the information source (e.g., a script file). In some examples, source definitions can be provided using a user interface (such as the user interface 301 shown in FIG. 3B and described below) or in one or more textual configuration files (an example of which is also described below). The web crawler 214 may use parsing rules to distinguish useful information (e.g., reputation information) from other information that need not be extracted (e.g., .html code that affects the format of the product review web site 209).

The information collection engine 202 may provide the reputation information 215 (which may include one or more units of reputation information, such as the unit of reputation information 213) to the reputation engine 204, which includes a reputation determination engine 218 and one or more reputation metric definitions 216. The reputation determination engine 218 uses the reputation metric definitions 216 to determine the reputation of a product based on the information received from the information collection engine 202. The reputation metric definitions 216 may include rules that define how reputation information is processed by the reputation engine 218. For example, the reputation metric definitions 216 includes rules that define how the reputation determination engine 218 will categorize the user review 210 based on the content of the reputation information 215. In some examples, the categories relate to common themes of product reviews, such as price, reliability, and availability. In this example, the reputation determination engine 218 could classify the user review 210 in the price category, as the user review 210 relates primarily to the alleged overpricing of Widget X. Categories can also be product-specific. For example, if the product being reviewed was a food (e.g., pasta), a category could be "taste."

In some examples, in order to quantify a product's reputation, the reputation determination engine 218 uses the reputation metric definitions 216 to generate a score 219 that represents a reputation of the product. A multi-category scoring system can be used, and a product may have one or more individual scores for each category. In some examples, the scoring system can be on a scale (e.g., of 1-100), where each category has a starting value (e.g., a starting value of 50). The reputation information 215 received from the information collection engine 202 may affect the scores of one or more of the categories, depending on the reputation metric definitions 216. For example, if Widget X had a score of 50 in a price category and then the reputation determination engine 218 received the reputation information 215 (e.g., a complaint about the price of Widget X), the reputation determination engine 218 would analyze the reputation information 215 according to the reputation metric definitions 216 and could lower Widget X's price score to 40.

The amount by which a score is raised or lowered is defined by the reputation metric definitions 216, and may also depend on the content of the reputation information 215. The reputation determination engine 218 may analyze the semantics and tone of the reputation information 215, as well as any ratings provided by a user on a predefined ratings scale (e.g., if the user gave the product three stars on a scale of one star to five stars). The reputation determination engine 218 may determine an overall score for the product based on the scores associated with the individual scoring categories. In some examples, the reputation determination engine 218 may weight reputation information based on language used in the text of the user review 210. For example, less weight can be given to a user review that is excessively rude or impolite, and more weight can be given to polite responses that appear well-reasoned and educated. The weighting analysis can be based on keywords that appear within the text of a source of reputation information, but can also be based on the information source. For example, reputation information obtained from a first information source may be weighted more heavily than similar reputation information obtained from a second information source.

The reputation determination engine 218 can provide any of the scores it has calculated to the rules engine 206 (e.g., in the form of a report or as a continuous data stream), and may also generate and output one or more reports 221 that provide an analysis of the reputation of a product for review by a user associated with the management of a product's reputation. In general, the rules engine 206 is a component of the system 200 that takes actions to counteract or to encourage a determined reputation. For example, a response engine 222 applies rule definitions 220 in order to determine whether to transmit one or more messages. We use the term rule broadly to include, for example, any circumstances under which an action may be taken, and an action that may be taken based on the circumstances. For example, as discussed below, a rule can specify a situation in which a response message will be sent to a destination.

The response engine 222 selects the type, frequency, content, and destination of any transmitted messages. Furthermore, the response engine 222 can consider both the reputation of a product (e.g., the reputation score 219), as well as the reputation information 215 and the unit of reputation information 213 to determine whether and how to respond. For example, because the user review 210 includes a question (which can be identified by one or more of the information collection engine 202, the reputation engine 204, and the rules engine 206), the response engine 222 may attempt to answer the question using predefined logic and/or user assistance. In some examples, if a question (or some other tone or attribute) is identified in a user review, a user-operator can be alerted and/or prompted so that a customized message can be created. The specific question presented in the user review 210 can be provided to the response engine 222 in the form of reputation information 215, the unit of reputation information 213, in the report 221, or a combination thereof.

Figure 3A:
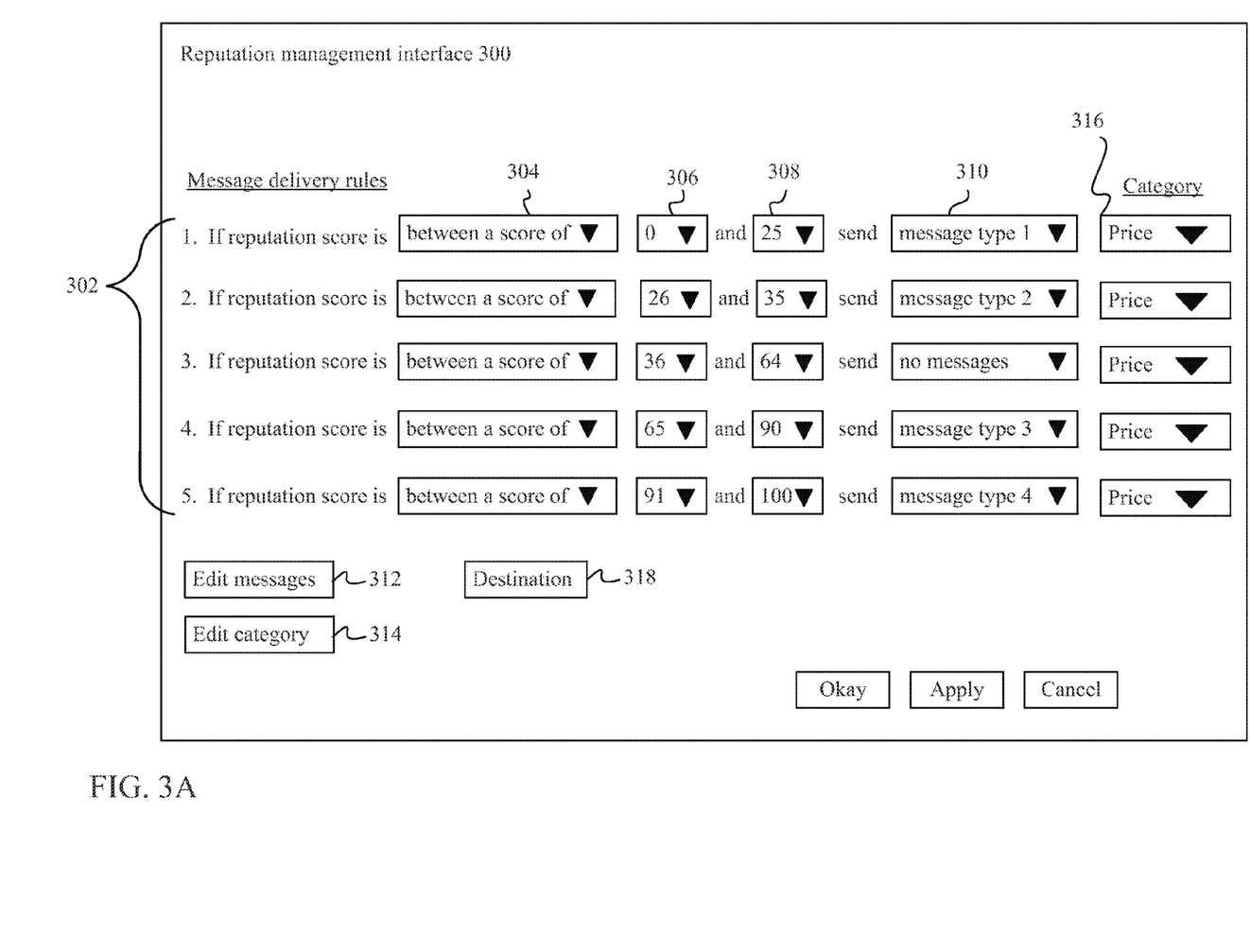
FIGS. 3A and 3B are diagrams of user interfaces.

The rule definitions 220 can define the conditions under which one or more messages will be transmitted by the response engine 222. A possible interface for specifying rules and conditions is shown in FIG. 3A. In some examples, the rules and conditions may include threshold values for a product's reputation. For example, the rule definitions 220 may specify that the response engine 222 should send a particular type of message if Widget X's reputation score drops below 40. In the example of FIG. 2, the response engine 222 has determined that the reputation of Widget X has satisfied a rule specified in the rule definitions 220 and, as a result, the response engine transmits a response message 224 to the information source 208. The response engine 222 is not limited to transmitting response messages to the same information source from which the reputation information was extracted; instead, the response engine 222 may transmit response messages to multiple venues in multiple forms. For example, the response engine 222 could transmit messages to ten different product review web sites, and could also send an email to individual user accounts associated with product review web sites. For example, in addition to transmitting the response message 224 to the information source 208, the response engine 222 may transmit a second response message 225 to a second destination 227.

In the example of FIG. 2, the response engine 222 sends the response message 224 to the information source 208 in the form of a forum response 226 that will be posted on the product review web site 209 along with the user review 210. Publishing the response message 224 in this way allows future readers of Widget X's review on the product review web site 209 to observe the response message 224 in context with the original complaint presented by the user review 210. In this example, the response message 224 attempts to assure future readers that Widget X is more expensive than another similar widget (Widget Y) because it uses higher quality materials and will likely last longer than other cheaper widgets.

In some examples, the response message 224 can be generated from a template 229 that includes one or more placeholders 231 for dynamic content. For example, the identity of the user associated with the user review 210 (i.e., "User 1") can be identified and stored by the web crawler 214, and can later be used to replace one or more placeholders in the response message 224. This technique could result, for example, in the generation and transmission of a message that personally addresses User 1 (e.g., "Thank you for your feedback, User 1 . . . "). Other dynamic content can include a time/date when a user review was posted, the name of the venue where the information was posted (e.g., the product review web site 209), product identifiers (e.g., product serial numbers or product names), a price of a product (e.g., as indicated by a user in a review), a current actual price of a product (e.g., a price can be provided from a most recently updated price source), one or more merchant locations (e.g., an address of a store near a user), a web resource that offers the same or similar products to those reviewed (e.g., an online store that carries the product), or a product-specific feature, (e.g., if the product is a good, a product-specific feature could be the caloric content of the food).

In order for the response message 224 to be posted on the product review web site 209, it may be necessary for the response engine 222 to create or obtain access to valid account credentials 233. In some examples, the response engine 222 can generate account credentials automatically or with user assistance. Once the response message 224 has been posted, the information collection engine 202 and the reputation engine 204 can continue to monitor the information source 208 to track how the response message 224 has influenced the public sentiment associated with Widget X, and may send additional response messages as necessary.

FIG. 3A illustrates a possible reputation management interface 300 for defining rules that govern the conditions under which response messages are generated and/or transmitted. The reputation management interface 300 includes a list 302 of customizable rules (1-5) for sending messages based on a reputation score of a product. Each rule in the list 302 includes a control for defining thresholds that, when satisfied by a reputation score, cause a message of a defined type to be sent (e.g., according to the message type specified by a message type control 310). The reputation management interface 300 can also include additional controls for defining the destination to which messages will be delivered (e.g., the destination control 318), as well as a time or frequency of delivery. The reputation management interface 300 may also include a category editing control 314 that may allow a user to specify one or more possible categories that can be associated with reputation scores, and may further include a control 316 for specifying which category a given reputation is associated with. In this example, the reputation scores are each associated with the "price" category, as indicated by the control 316.

In this example, the five rules in the list 302 define five non-overlapping reputation score ranges that cover an overall range of 0-100, where a score of 0 represents an extremely negative reputation and a score of 100 represents an extremely positive reputation. The list 302 may contain any number of rules. For each rule, the range controls 304, 306, and 308 define a minimum and maximum reputation score that will satisfy the rule, while the message type control 310 specifies a message that will be sent when the rule is satisfied (e.g., when the reputation score falls between the defined range for that rule). For example, rule 1 specifies that when a product's reputation score falls between a score of 0 and 25, a message of type 1 will be sent. In some examples, a message of type 1 could be an email, a forum post, a social network message, an instant message, or a physical mailing.

The reputation management interface 300 also includes a message editing control 312 that, when activated, allows a user to alter message content, such as the text, format, tone, or delivery form of a message. Activation of the message editing control 312 can cause an additional interface or screen to be presented to a user.

Figure 3B:
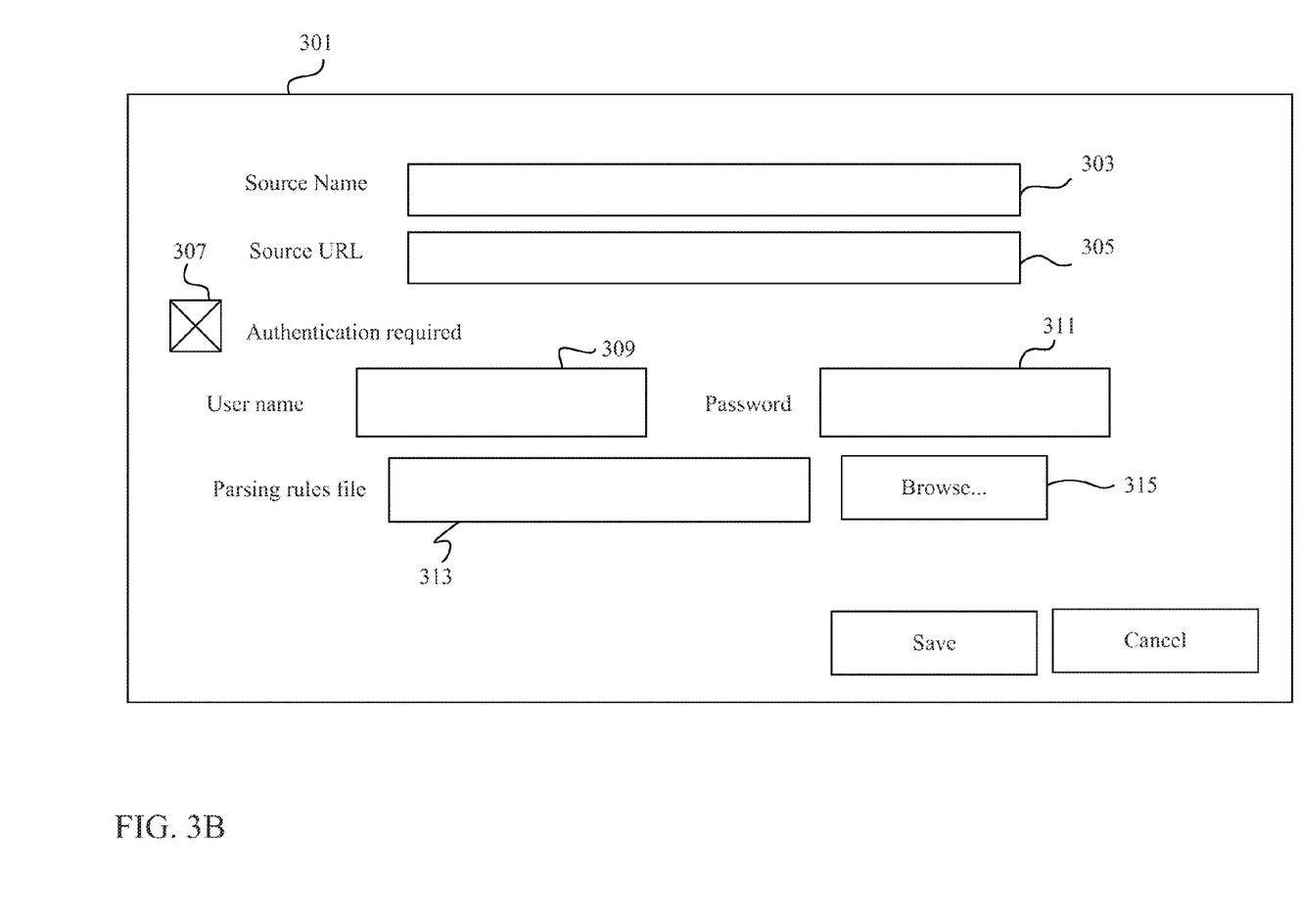

FIG. 3B shows a user interface 301 for providing one or more configuration files (e.g., parsing rules files) to a reputation management system and for defining information sources. For example, a source name field 303 and a source URL field 305 can be used to specify a name (e.g., a user-defined name, such as a "nickname") of an information source and a location of that information source, respectively. The user interface 301 also includes an authentication indication control 307 that signifies whether the information source defined in the source name field 303 and the source URL field 305 require a defined identity (e.g., account credentials) in order for the reputation management system to receive data from, or transmit data to, the information source. In this example, the authentication indication control 307 has been activated (i.e., the box associated with the authentication indication control 307 has been checked).

In some examples, when an information source requires account credentials to access an information source (e.g., when the authentication indication control 307 has been activated), the reputation management system may require that further information be entered by a user or by an automated process. In the user interface 301, authentication information can be entered in a user name field 309 and a password field 311. These credentials can be stored (e.g., in the source definitions 212) so that the reputation management system may use the credentials to log in (or otherwise gain access to) the services associated with an information source.

The user interface 301 also includes a parsing rules file field 313 that allows a user to select a rules or configuration file to upload to the reputation management system to store in, for example, the source definitions 212 and to associate with the information source defined by the source name field 303 and the source URL field 305. A browse control 315 can allow a user to search one or more storage locations for a suitable rules or configuration file to provide in the parsing rules file field 313.

Once defined, the source name, URL, authentication parameters (e.g., a username, a password), and one or more parsing rules files can be stored in a source definitions module, such as the source definitions 212 (FIG. 2).

The computer code below represents a sample portion of a rules or configuration file:

```
<sources>
    <source authreq="true" name="Source1">
        <url>http://somesite.com/path/to/source</url>
        <username>user</username>
        <password>pass</password>
        <rules>
            <rule id="1" target="message">
                <regex>......</regex>
            </rule>
                <rule id="2" target="useridentity">
                <regex>......</regex>
            </rule>
            ...
        </rules>
    </source>
    <source name="Source2">
        ...
    </source>
    ...
</sources>
```

The instructions in lines 6-14 represent an example of a content parsing rules file that may be provided (e.g., uploaded), for example, using the interface 301 shown in FIG. 3B using the parsing rules file field 313 and/or the browse control 315. The rules, such as the rule specified in line 7 of the code above (i.e., <rule id="1" target="message">) specifies the information that will be extracted from an information source (e.g., the rule at line 7 specifies that a message posted by a user will be extracted). Similarly, the rule at line 10 (<rule id="2" target="useridentity">) specifies that the target information to be extracted is an identity of the user who posted the message referred to in the previous rule. As shown in line 2 of the code above (i.e., <source authreq="true" name="Source1">), the rules defined by the content parsing rules file are associated with "Source1."

Figure 4:
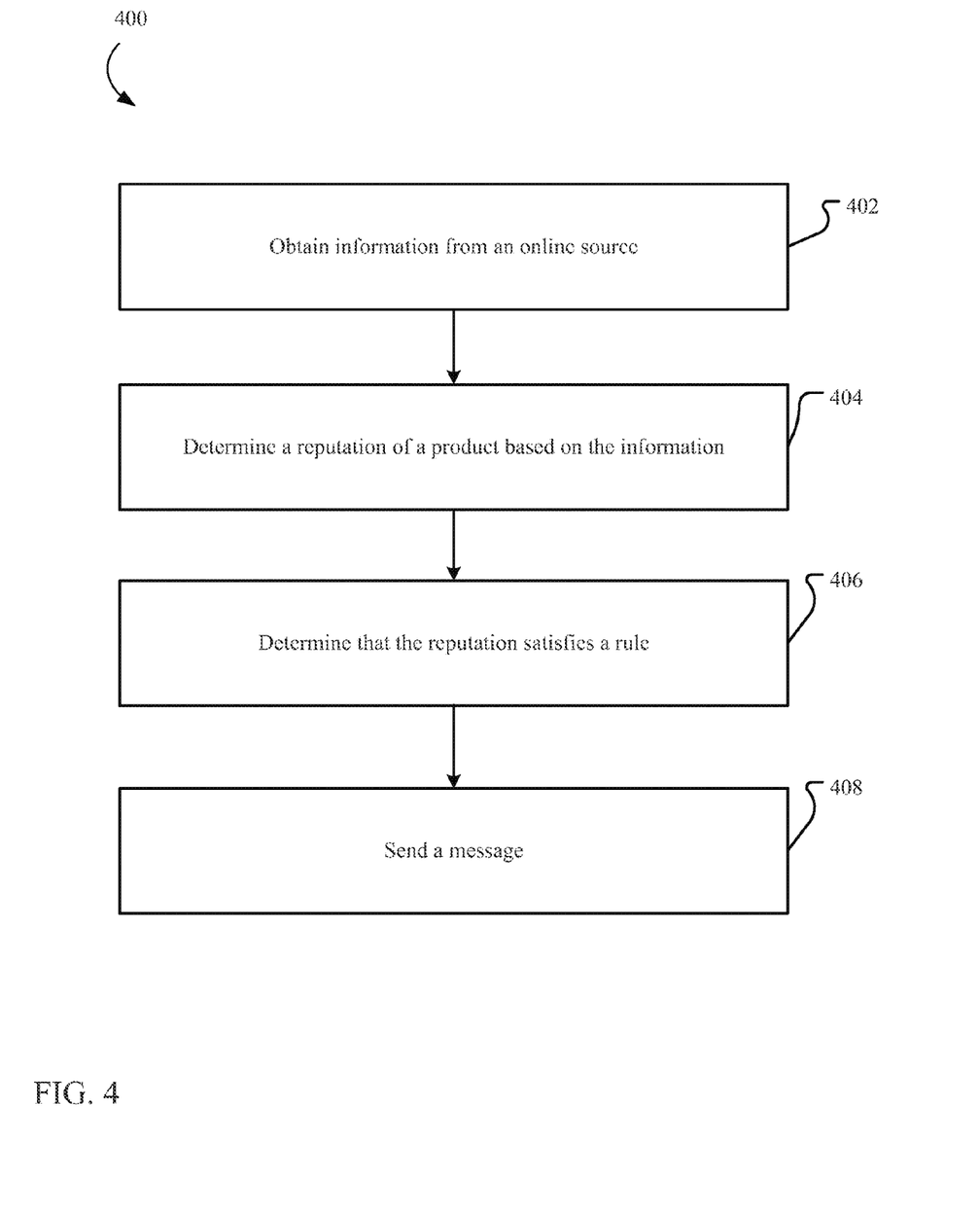
FIG. 4 is a flow chart.

FIG. 4 illustrates a process 400 for managing a reputation of a product, and the various aspects of the process 400 may be carried out by one or more of the systems and components described here. Information is obtained from an online source (402). For example, information that is indicative of the reputation of a product is extracted or received from one or more sources of information, such as web sites. The information can be extracted using web tools (e.g., a web crawler) or can be compiled and provided by one or more third party data mining entities. Information such as metadata and dynamic information can also be obtained from the online source, such as product numbers and user identities. The information can be aggregated and provided to a reputation determination engine in batches (e.g., batches of a predetermined size or "on demand," such as in response to a user request for information), or can be provided continuously in real time.

The reputation is determined based on the information (404). For example, a reputation determination engine uses the information collected from the online source to quantify or otherwise provide a measure of the reputation of a product. The reputation can be based on a variety of scoring metrics, such as a 0-100 scale or a category-based metric (e.g., "positive," "neutral," and "negative" sentiments). As above, the reputation of a product can be determined based on batches of information, in response to a user command, or can be continuously determined and updated using a real-time information feed. When determining the reputation (or when collecting the information), information can be weighted according to a variety of factors, such as the language (e.g., keywords or tone) of an associated message or post.

The reputation is determined to have satisfied a rule (406). For example, a response engine may apply a set of pre-defined rules to the reputation and/or the reputation information of a product to determine which responsive action, if any, should be carried out. The rules can be created from scratch by a user or can be selected from a set of pre-generated rules which can then be applied or customized. The rules may define whether any messages will be sent and, if so, the rules may also specify the form and content of the message, the destination of the message, and other parameters. For example, the rules may define an account identity (e.g., credentials) registered or otherwise associated with a given destination to use to send messages. In some examples, different registered identities can be stored and used to prevent human users from recognizing that automated messages are being sent by a reputation management system (e.g., the reputation management system can be disguised as one or more human users). The identity used by a reputation management system may be automatically chosen according to a scheduler (e.g. in round robin fashion). Because users in some forums earn points and/or a status (e.g. a "Novice" or "Expert" user status) depending on a number of messages posted and/or a number of positive feedbacks received, the reputation management system can determine that a particular identity should not be used if, for example, that identity has received too many negative feedbacks, "dislikes," or reported abuse flags (e.g., from other users).

In some examples, the rules may also define the type of message to send. For example, the rules may define that the message type will be a direct response to a message (e.g., a message sent using a "reply" function in a forum, where the message would be posted below the original message) or a general post (e.g., a message sent using a "post" function of a forum, where posts would appear after a last post in the forum). The rules may also specify a number of times a particular message or type of message can be used (e.g., overall uses, or uses within a specific venue), and may also specify an amount of delay between posts. Specifying the amount of delay can prevent the reputation management system from sending a undesirably large number of messages to the same or multiple destinations (e.g., "spamming").

The message is sent (408). For example, a message that tends to offset or encourage a determined reputation of a product can be transmitted or published to one or more venues. The message can be transmitted privately (e.g., as an email or instant message) and/or publicly (e.g., a post to a forum or news article, or a message on a social networking web site). The message may include dynamic content to specifically or personally address an item from a previous message. For example, if a user is identified as an author of a review of a product on a web page and the user's identity is obtained as reputation information, placeholder content in a response template can be replaced with the user's identity. For example, in FIG. 2, the identity of the author of the user review 210 (i.e., User 1) could replace the placeholder content 231 in the template 229. As a result, the response message 224 could address personally address User 1 (e.g., by including the salutation: "Dear User 1").

Figure 5:
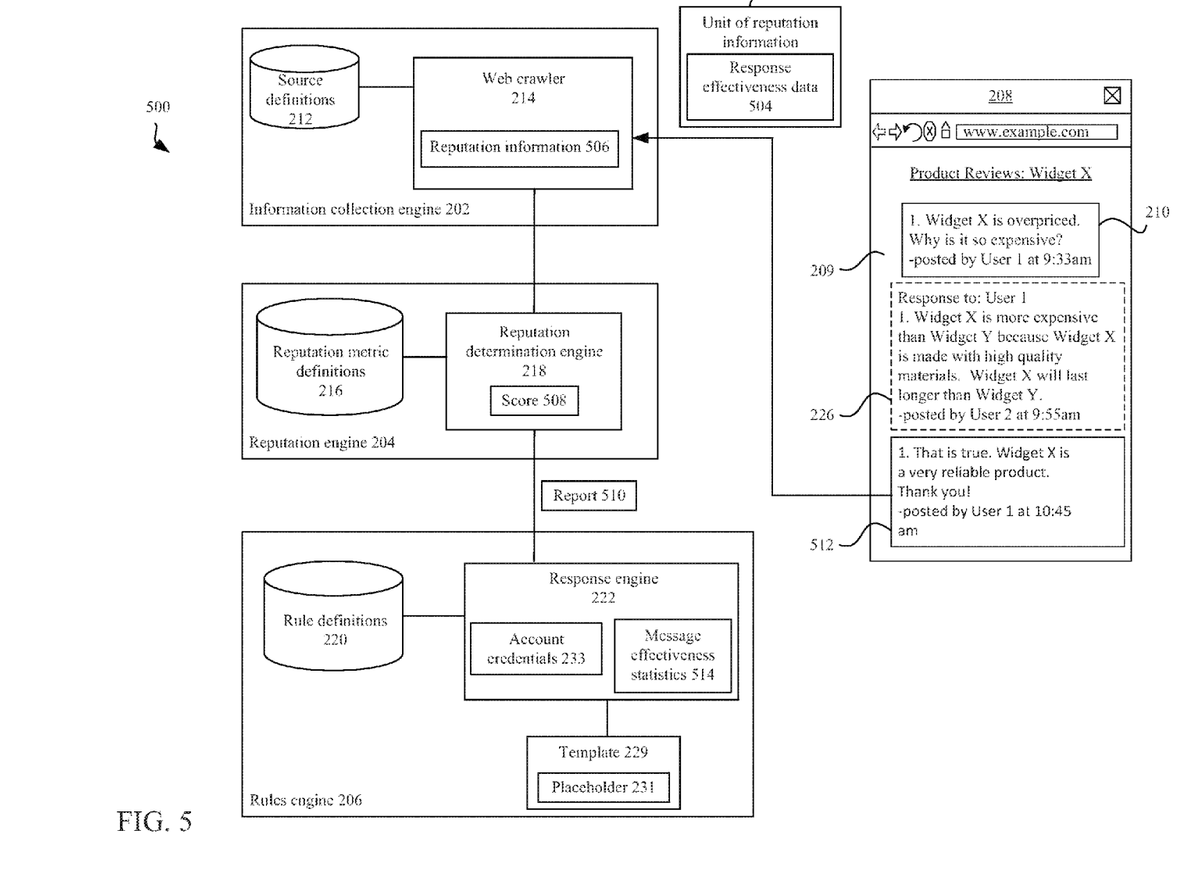

As shown in FIG. 5, after the message (e.g., the response message 224) has been sent, a success of the message can be monitored using a similar process. FIG. 5 shows a system 500 that, like the system 200 shown in FIG. 2, is a system for monitoring and managing the reputation of a product. In this example, the response message 224 has been sent to the information source 208 in the form of the forum post 226. To monitor the effectiveness of the response message 224, the information collection engine 202 can continue to be collect units of reputation information from the same (or similar) information sources to detect any changes in sentiment that occur within a specified period of time after the response message has been sent, with additional messages being sent as necessary.

The web crawler 214 may collect a unit of reputation information 502 that includes response effectiveness data 504. In this example, the response effectiveness data 504 could be based on a user response 512 posted by the original author of the user review 210: User 1. The response effectiveness data may indicate that the response message 224 was well-received by User 1 based on the text of the user response 512, which indicates that User 1 agrees that Widget X is a reliable product. The unit of reputation information 502 (including the response effectiveness data 504) may be used to calculate updated reputation information 506, which may in turn be used to calculate an updated score 508 by the reputation determination engine 218.

The success of various messages, keywords, and other aspects of the reputation management process can be tracked to identify the most effective techniques for managing a product's reputation. For example, the reputation determination engine 218 may provide a report 510 to the rules engine 206, which may specify that an additional message should be sent to one or more information sources, and may also include information regarding the success of the response message 224. The effectiveness of the response message 224 (as well as any other response messages) can be maintained in a log of message effectiveness statistics 514. In some examples, if a message has been found to consistently improve the reputation of a product, that message might be identified in the log of message effectiveness statistics 514 as an effective message that should be sent more frequently by the response engine 222. The success of response rules, message templates, and information sources can also be tracked in the log of message effectiveness statistics 514 to identify the best combinations of each element.

Figure 6:
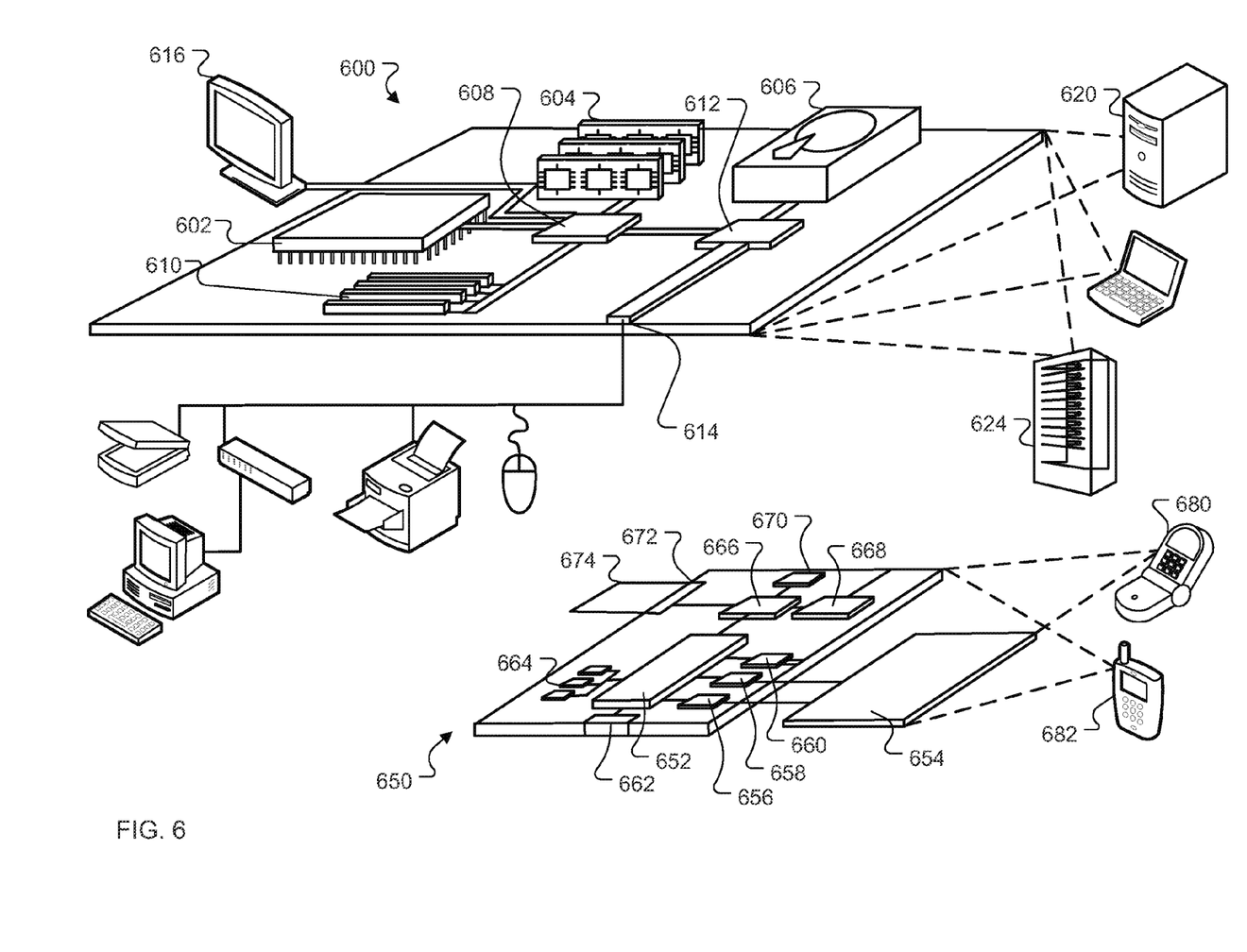

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems.

Other implementations are within the scope of the following claims.

The invention claimed is:

1. A method comprising:
enabling, with a processing device, a user to specify a rule for forming a message about a reputation associated with a product, the rule defining conditions under which the message is to be transmitted and specifying a template to use to generate the message, the conditions comprising a threshold value of a reputation score of the product;
enabling, with the processing device, the user to specify source definitions, wherein the source definitions comprise:
a Uniform Resource Locator (URL) associated with an online source; and
a script file comprising parsing rules;
extracting, by a web crawler, multiple different reviews of the product from the online source using the parsing rules, where the multiple different reviews of the product are indicative of one or more aspects of the reputation associated with the product;
determining, by a reputation determination engine, a reputation of the product based on the multiple different reviews of the product using reputation metric definitions to generate the reputation score, wherein the reputation metric definitions comprise rules defining a categorization of the content of the multiple different reviews;
determining, by the processing device, whether the reputation score of the product based on the multiple different reviews of the product satisfies the threshold value defined by the rule;
in response to determining that the reputation score of the product based on the multiple different reviews of the product satisfies the threshold value defined by the rule, identifying, by the processing device, the template specified by the rule, where the template comprises one or more placeholders for dynamic content and pre-defined text to include in the message;
forming, by the processing device, the message about the reputation associated with the product based on replacing the one or more placeholders of the template with content from a review of the multiple different reviews; and
transmitting, by the processing device, the message about the reputation associated with the product to the online source that the multiple different reviews of the product were extracted from.

2. The method of claim 1 comprising:
weighting the information.

3. The method of claim 2, wherein the weighting is based on a keyword associated with the information.

4. The method of claim 3, wherein the weighting is based on the online source of the information.

5. The method of claim 1, wherein the message offsets the reputation or supports the reputation.

6. The method of claim 1, wherein the placeholder data is associated with one or more of a user name, a product identity, or an information source.

7. The method of claim 1, wherein the information is grouped into predefined categories based on a theme of the information.

8. The method of claim 7, wherein the predefined categories are associated with respective reputations, the respective reputations being based on the information in the respective categories.

9. The method of claim 1, wherein the message comprises one or more of a forum post, an email, an instant message, physical mail, and a social network message.

10. The method of claim 1, wherein the rule specifies one or more of a content of the message, a tone of the message, a time at which the message will be sent, and a frequency with which the message will be sent.

11. The method of claim 1 comprising determining an effectiveness of the message.

12. The method of claim 11, wherein determining the effectiveness comprises gathering updated information from an online source.

13. The method of claim 12 comprising forming future messages based on the updated information.

14. The method of claim 1, wherein transmitting the formed message comprises enabling the user to define when the formed message is to be transmitted based on specified conditions associated with the obtained information for the product.

15. The method of claim 1, wherein transmitting, by the processing device, the message about the reputation associated with the product to the online source that the multiple different reviews of the product were extracted from comprises:
providing instructions to the online source to generate a review that includes the message.

16. The method of claim 1, wherein the conditions further comprise a categorization of the content of the multiple different reviews.

17. One or more computer storage devices comprising instructions that, when executed by one or more processing devices, cause the one or more processing devices to perform operations comprising:
enabling, with a processing device, a user to specify a rule for forming a message about a reputation associated with a product, the rule defining conditions under which the message is to be transmitted and specifying a template to use to generate the message, the conditions comprising a threshold value of a reputation score of the product;
enabling, with the processing device, the user to specify source definitions, wherein the source definitions comprise:
a Uniform Resource Locator (URL) associated with an online source; and
a script file comprising parsing rules;
extracting, by a web crawler, multiple different reviews of the product from the online source using the parsing rules, where the multiple different reviews of the product are indicative of one or more aspects of the reputation associated with the product;
determining, by a reputation determination engine, a reputation of the product based on the multiple different reviews of the product using reputation metric definitions to generate the reputation score, wherein the reputation metric definitions comprise rules defining a categorization of the content of the multiple different reviews;
determining, by the processing device, whether the reputation score of the product based on the multiple different reviews of the product satisfies the threshold value defined by the rule;
in response to determining that the reputation score of the product based on the multiple different reviews of the product satisfies the threshold value defined by the rule, identifying, by the processing device, the template specified by the rule, where the template comprises one or more placeholders for dynamic content and pre-defined text to include in the message;
forming, by the processing device, the message about the reputation associated with the product based on replacing the one or more placeholders of the template with content from a review of the multiple different reviews; and
transmitting, by the processing device, the message about the reputation associated with the product to the online source that the multiple different reviews of the product were extracted from.

18. A system comprising:
one or more processing devices; and
one or more memory devices storing instructions that, when executed by the one or more processing devices, cause the one or more processing devices to perform operations comprising: enabling, with a processing device, a user to specify a rule for forming a message about a reputation associated with a product, the rule defining conditions under which the message is to be transmitted and specifying a template to use to generate the message, the conditions comprising a threshold value of a reputation score of the product;
enabling, with the processing device, the user to specify source definitions, wherein the source definitions comprise:
a Uniform Resource Locator (URL) associated with an online source; and
a script file comprising parsing rules;
extracting, by a web crawler, multiple different reviews of the product from the online source using the parsing rules, where the multiple different reviews of the product are indicative of one or more aspects of the reputation associated with the product;
determining, by a reputation determination engine, a reputation of the product based on the multiple different reviews of the product using reputation metric definitions to generate the reputation score, wherein the reputation metric definitions comprise rules defining a categorization of the content of the multiple different reviews;
determining, by the processing device, whether the reputation score of the product based on the multiple different reviews of the product satisfies the threshold value defined by the rule;
in response to determining that the reputation score of the product based on the multiple different reviews of the product satisfies the threshold value defined by the rule, identifying, by the processing device, the template specified by the rule, where the template comprises one or more placeholders for dynamic content and pre-defined text to include in the message;
forming, by the processing device, the message about the reputation associated with the product based on replacing the one or more placeholders of the template with content from a review of the multiple different reviews; and
transmitting, by the processing device, the message about the reputation associated with the product to the online source that the multiple different reviews of the product were extracted from.

* * * * *